Figure 15:
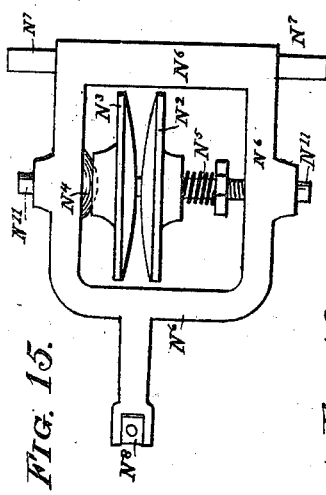

(No Model.) 5 Sheets—Sheet 1.
W. E. SMITH.
METHOD OF AND APPARATUS FOR MANUFACTURING WIRE GLASS AND SHEET GLASS.
No. 560,759. Patented May 26, 1896.
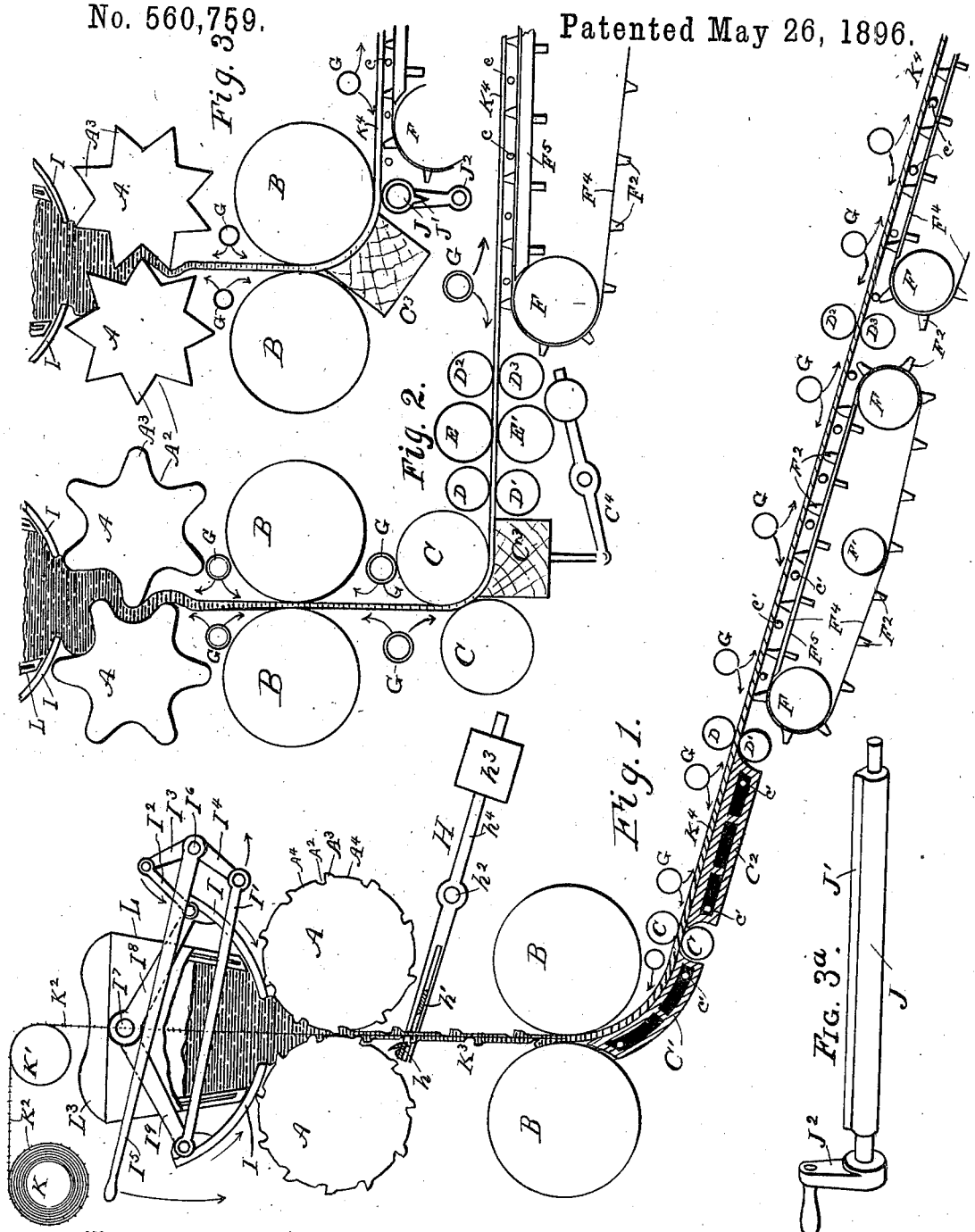
WITNESSES
John Wilson
Henry P. Rush
INVENTOR
Wm Ed Smith

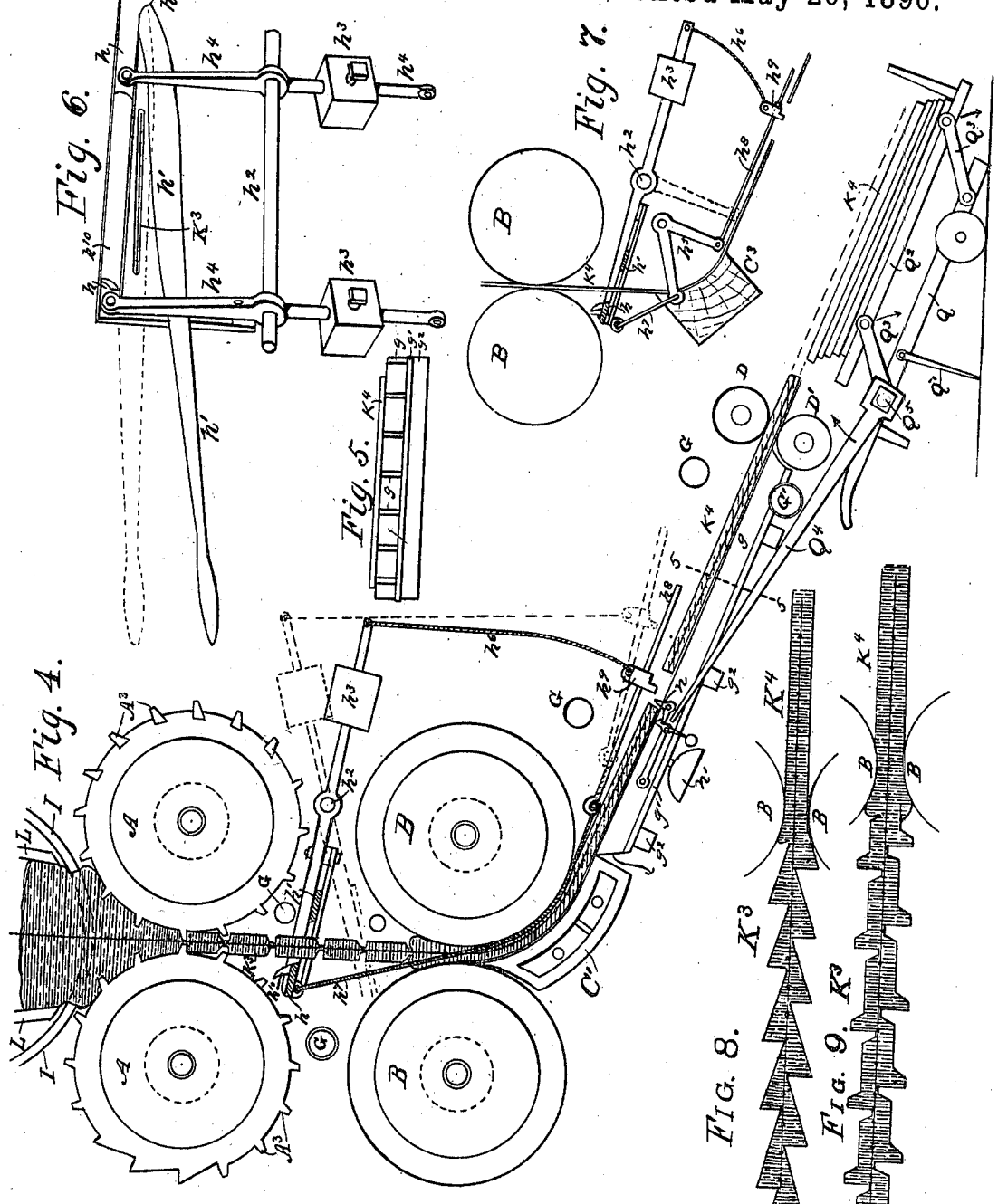

(No Model.)
W. E. SMITH.
METHOD OF AND APPARATUS FOR MANUFACTURING WIRE GLASS AND SHEET GLASS.
No. 560,759.
Patented May 26, 1896.
5 Sheets—Sheet 3.
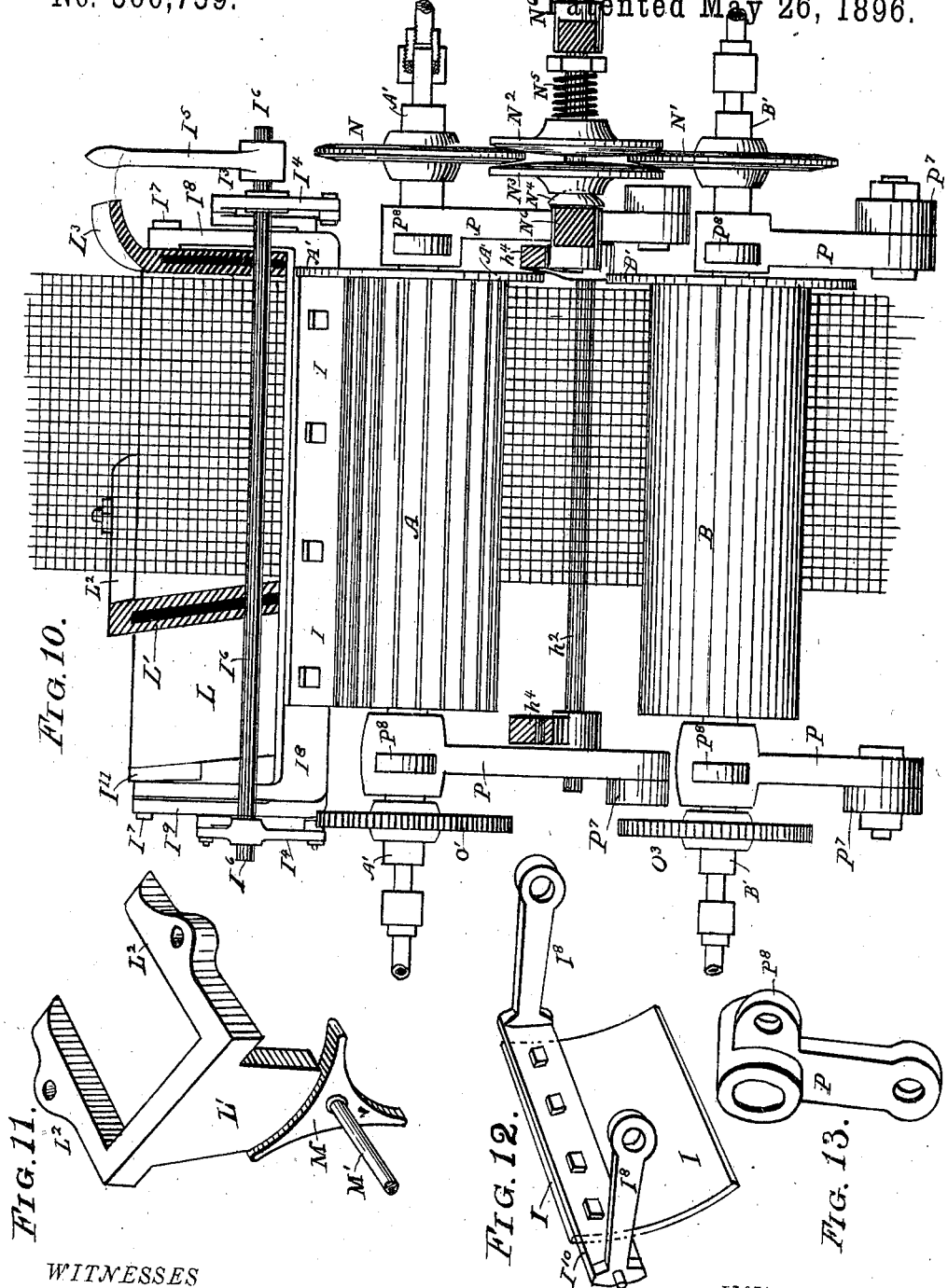
WITNESSES
John Wilson
Henry F. Rush
INVENTOR
Wm. Ed. Smith (No Model.)

W. E. SMITH.
METHOD OF AND APPARATUS FOR MANUFACTURING WIRE GLASS AND SHEET GLASS.

No. 560,759.  Patented May 26, 1896.

5 Sheets—Sheet 4.

WITNESSES
John Wilson
Henry F. Rush

INVENTOR
Wm E. Smith

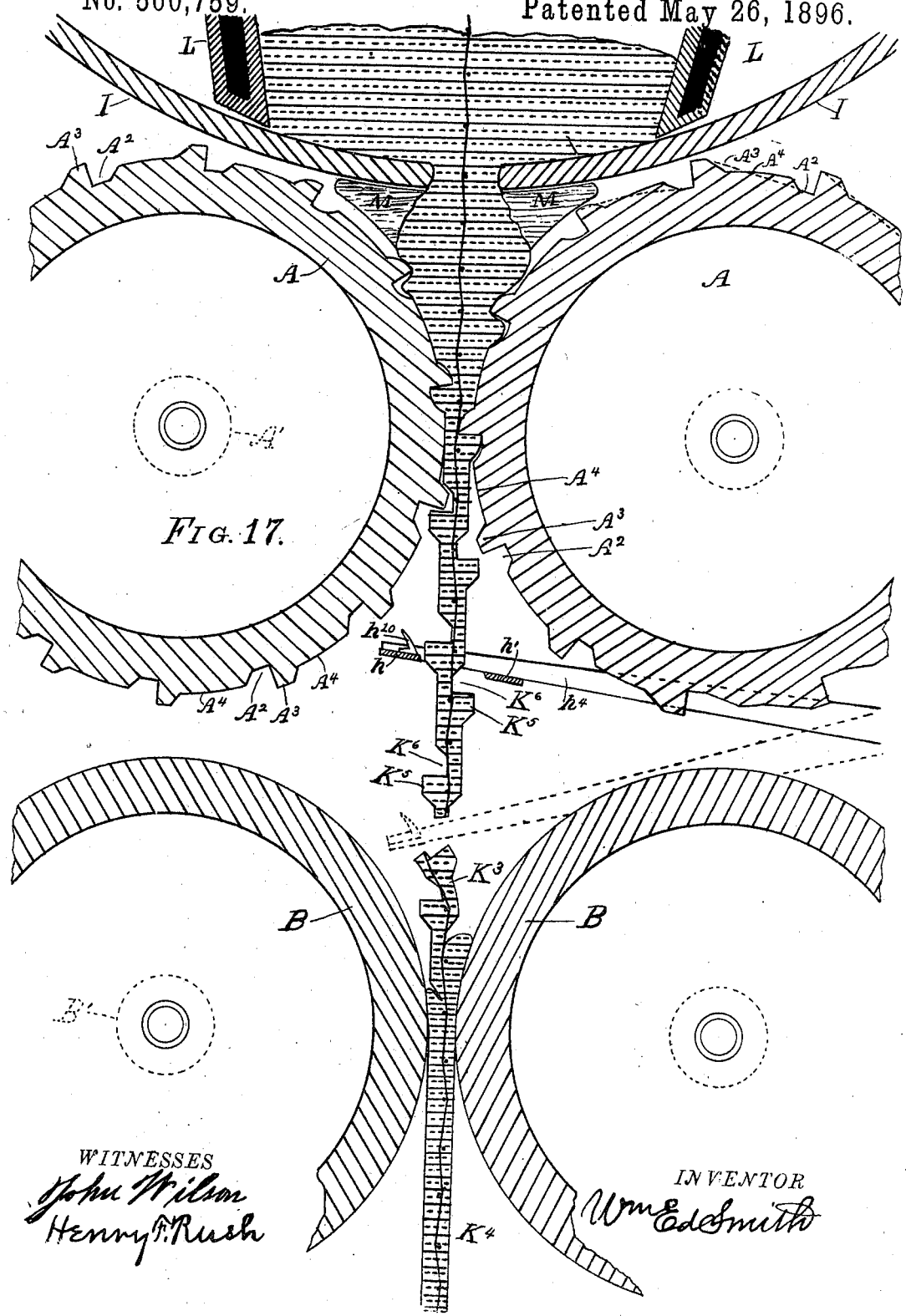

UNITED STATES PATENT OFFICE.

WILLIAM ED. SMITH, OF BALTIMORE, MARYLAND, ASSIGNOR TO JAMES J. PURMAN OF WASHINGTON, DISTRICT OF COLUMBIA.

METHOD OF AND APPARATUS FOR MANUFACTURING WIRE-GLASS AND SHEET-GLASS.

SPECIFICATION forming part of Letters Patent No. 560,759, dated May 26, 1896.

Application filed December 28, 1895. Serial No. 573,676. (No model.)

*To all whom it may concern:*

Be it known that I, WILLIAM ED. SMITH, of Baltimore, in the State of Maryland, have invented a new and Improved Method of and Apparatus for the Manufacture of Wire-Glass and Sheet-Glass, of which the following is a specification, reference being had to the accompanying drawings, in which like letters show like parts throughout.

The object of my invention is to produce slabs or sheets of glass having wire-netting embedded therein, and known as "wire-glass," or to produce by similar process and like apparatus sheets of glass without such inclosed wire-netting.

More specifically, it consists in forming sheets of either kind of definite and variable dimensions, as desired, in the same machine, and in producing such sheets very cheaply and rapidly and of superior quality in continuous succession instead of producing only one sheet at a time as a separate operation, as heretofore.

My invention consists in the process of forming glass made plastic by heat first into rough initial sheets or slabs by passing it from a suitable hopper between a pair of roughened or fluted rolls, then passing this rough initial sheet between a pair of smooth rolls to reduce it from a rough or fluted sheet to a smooth sheet while still hot, with or without wire-netting inclosed in it.

It further consists in apparatus for forming the sheets of any desired width in the same machine, and in apparatus for cutting these sheets into any desired length as they progress through the machine.

It further consists in means for varying the speed of one pair of rolls relative to that of the other pair at the will of the operator.

It further consists in means for cutting off the sheets of measured length as they pass through the machine without stopping the machine.

It further consists in means for cooling and off-bearing the sheets continuously as they are formed, so that there is no waiting for a sheet to cool upon a casting-table before it can be removed and another one formed in its place, as heretofore practiced.

My invention further consists in a special form of hopper for receiving the molten glass and delivering it to the rolls, whereby its delivery may be regulated at will by sliding plates or shutters which deliver the plastic glass in a vertical stream of any desired thickness between rather than upon the rolls, giving it less chance and less time to chill by lying upon the rolls as it has done heretofore in attempts to roll a mass of glass between smooth rolls. The hopper I have invented also enables me to deliver the molten glass in a more proper form or shape, being already reduced by the hopper to a flat stream or thick sheet, and is delivered at the proper place within the bite of the rolls to be carried through the rolls without clogging or choking the latter.

It further consists in making the operation of the machine once started continuous in all its parts until the quantity of glass delivered in the hopper has all been worked out, not requiring any such stoppage as would endanger cooling of the glass and choking of the machine.

My invention further consists in details hereinafter described, and pointed out in the claims.

It is a very old scheme, often tried, to form glass plates by passing hot plastic glass down between a pair of smooth rolls, which are to convert it from a plastic mass into a rolled sheet. This plan has always failed for the following reasons: The rolls while hot must be below red heat, as at about red heat or anything higher hot glass sticks or welds fast to iron and most other metals, and it sticks most tenaciously, so that the rolls and the glass become one welded mass, inseparable so far as any rolling of sheets is concerned; but upon the other hand if the rolls are much cooler than red-hot glass, and they have to be considerably cooler, the surface of the metal rolls rapidly withdraws heat from that portion of the glass which lies in contact with them, which portion stiffens and hardens this contacting surface of the glass into a double-crescent-shaped crust upon and between the rolls, making it stiff enough so that it will not pass through, but rides upon the smooth rolls, as their smooth surface slides under it with little friction and no power to draw it through between them, and every moment's delay further increases the difficulty by its continued cooling by longer contact with the rolls. I have discovered, however, during three years of experiments and study that by using roughened, fluted, or toothed rolls to precede smooth ones this difficulty can be obviated. If we take fluted metal rolls heated not hot enough for the glass to stick to them, dump a quantity of plastic glass upon and in the trough or bite formed between them, and turn the rolls, the fluted or toothed surfaces of the rolls mix, agitate, and bite into the surface of the soft glass and carry it along and through between the rolls with the teeth, thus mixing the lower and cooler portion with the hotter portion immediately above it and carrying this mixed bottom portion through between the rolls instead of its remaining stationary, as it does on smooth rolls, while only the hotter central portion, if any, descends through between such smooth rolls. These rough or fluted rolls produce, according to the nature of their surfaces, either a rough or fluted surfaced sheet of uneven thickness, or may produce a sheet of uniform thickness, but similary corrugated upon both its surfaces, which corrugations or fluting may be straightened out into a flat sheet of the same thickness by smooth rolls, or may be reduced to a thinner flat sheet by smooth rolls immediately following the fluted rolls while the glass is still hot enough to be ductile and flexible. The glass should be rather hotter and softer than for rolling into plate-glass upon a casting-table, and for wire-glass it may be very soft when poured into the hopper, as some allowance must be made for slight cooling by contact with the hopper and rolls, and it must be still plastic or not crusted or stiffened when passed between the rolls.

The wire-glass now upon the market is made by the Shuman process, which consists in cutting wire-netting into sheets of the dimensions desired to fill an order for the glass, then pouring molten glass upon a hot casting-table, and passing over this a truck having three rolls. The forward smooth roll flattens the glass out into a sheet. The wire-netting is fed upon top of this sheet in the rear of the first roll, the middle roll having thin-edged circumferential ribs extending slightly below the bottoms of the other rolls, which ribs press the netting down into the center of the glass sheet, the glass coming up through the meshes and between the ribs on the central roll. Then the rear smooth roll closes down this glass projecting up through the meshes, and thus covers the embedded wires and forming the sheet, which then has to lie a short time longer on the casting-table until it has stiffened enough to be slid off and passed to the annealing-oven before another sheet can be cast. After annealing the surplus unwired ends of the sheet must be trimmed off up to the netting. While this process is commercially very successful at the high prices at which wire-glass is sold, such machines so operated necessarily have a very limited daily output. It will be noted that in this Shuman method the netting is forced into the glass sheet through one of its sides, which cuts that face all up into little squares or hexagons corresponding to the mesh of the netting, and while the rear roll nearly closes these cuts it fails to obliterate the slight grooves or hair-lines resembling alligator-leather. Besides these there are usually visible parallel lines, which are contracted tracks of the ribs on the central roll.

In my improved process the wire-netting is not introduced from the side of the sheet, but passes endwise into it through the central hottest part of the mass of glass where it is most thoroughly heated and therefore most perfectly welded to the glass, leaving no trace of its entering-places, and at the same time the ribs on my rough rolls are longitudinal of the rolls, and the smooth rolls pass square across their tracks, not lengthwise of them, and thus entirely fill up and obliterate them. Again, I pass the netting from a reel vertically down through a hopper, where it is partly heated before it reaches the glass, then through the mass of the molten glass, where it is highly heated and more perfectly welded to the glass than it can be in any of the methods of introducing it through one side of the sheet or of passing the glass through the netting from one side, and, passing vertically down into the hot glass, all air and generated gases are driven out and escape upward as the hot glass flows in from the sides to fill the meshes in the netting as it descends into it and before it leaves the hopper.

Figure 16:
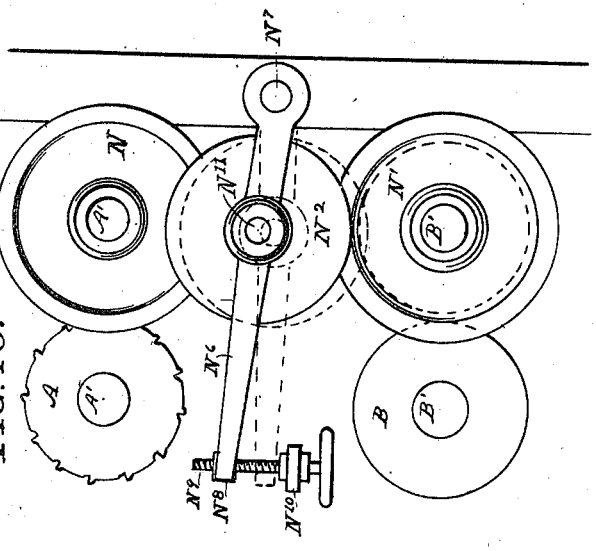
Figure 14:
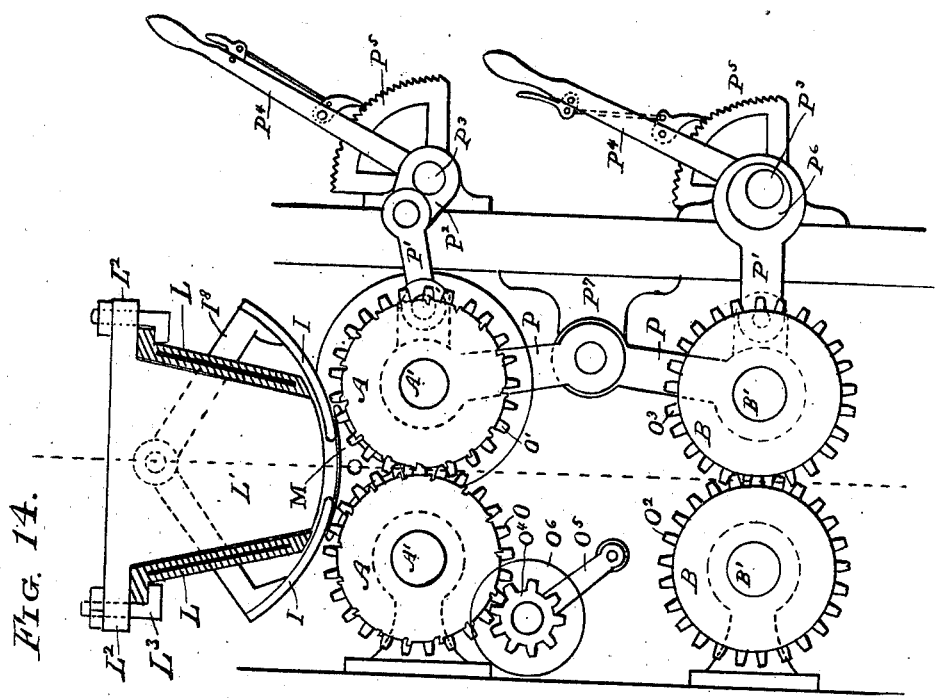

In the drawings, Figure 1 is a side elevation, partly in section, of my machine specially adapted for making wire-glass. Figs. 2 and 3 are similar views of modifications more especially adapted for making sheet-glass without wire-netting in it. Fig. 3ᵃ is a detail perspective view of a roller with a knife-edge along its side for cutting off hot sheets of glass, as shown in Fig. 3. Fig. 4 is a somewhat enlarged view of the machine for making wire-glass with apparatus for cutting it into measured lengths as it passes through the machine. Fig. 5 is a cross-sectional view on a line 5 5 of Fig. 4. Fig. 6 is a perspective view of a form of shears for cutting off wire-glass sheets located between the fluted and the smooth rolls. Fig. 7 is a side view of the same shears with a modified form of measuring device for cutting the sheets into measured length. Figs. 8 and 9 show longitudinal sections of the wire-glass made as in Fig. 4, showing the grooved sheets at the left-hand end, as made by the toothed or fluted rolls, and the right-hand showing them as finished by the smooth rolls. Fig. 10 is a side elevation of the machine, partly in section, showing the cog-gear connecting the rolls of each pair upon the left and a variable friction-gear upon the right which connects the separate pairs of rolls. Fig. 11 shows a perspective view of a detached adjustable end of the hopper to adapt it to different widths of netting. Fig. 12 is a perspective view of one of the movable gates or shutters for opening and closing the bottom of the hopper. Fig. 13 is a perspective view of one of the pivoted bearing-supports for adjustably holding the rolls in the frame of the machine. Fig. 14 is an end elevation of parts of the machine, showing the spur-gear of each pair of rolls and means for adjusting the rolls toward and from each other. Fig. 15 is a plan view of a pivoted adjustable frame for supporting the middle friction-wheels of the variable gear which connects the two pairs of rolls. Fig. 16 is a side elevation of this same friction-gear; and Fig. 17 is an enlarged sectional view of the bottom portion of the hopper and closing gates, with sections of the fluted or toothed rolls forming the rough sheet of glass upon the wire-netting and the smooth rolls for reducing the rough sheet to a smooth one as it passes between them.

The machine consists of a hopper L, supported upon a suitable frame of the machine. Immediately below the hopper is a pair of toothed or fluted rolls A A for forming the molten glass coming from the hopper into a rough initial sheet. Below these rough rolls is a pair of shears $h\ h'$ for cutting the rough initial sheet of wire-glass $K^3$ into sheets $K^4$ of desired length, while immediately below this is a pair of smooth rolls B B for rolling the rough sheets into smooth ones, which are then deflected over a suitable concave $C'$ to one side into a horizontal or slightly-inclined direction, where by suitable rollers or slatted endless apron conveyers the glass sheets are passed along in a straight direction while exposed to cooling blasts of air till they become cool and stiff enough to be removed to an annealing-oven.

The hopper L is rectangular in horizontal section and preferably made with hollow walls, into which hot steam or other heating medium may be introduced for heating the hopper before first starting, and after starting and becoming heated from the molten glass a cooling medium may be circulated therein to prevent its heating high enough to cause the hot glass to stick to its walls. To accommodate the hopper to various widths of wire-netting, it has one end L' made adjustable in and out within the side walls, the adjustable end L' being provided with integral extension-arms $L^2$. (Shown best in Figs. 10 and 11.) Hook-headed bolts $L^3$ pass through the holes in $L^2$ and hook under the top flange of the hopper, as shown in Fig. 14, which firmly clamp the arms $L^2$ and end L' in any position desired within the hopper, as shown in Fig. 10. A three-cornered curved-sided plate M, Fig. 11, fits between and over the rolls A A just below the hopper-gates I I, which plate M prevents the molten glass from spreading sidewise beyond the netting within this space filled by M. This plate M is also made adjustable lengthwise of the rolls, so as to be about under the adjustable end of the hopper L'. The plate M is secured by the rod M', held by a set-screw in the frame of the machine, or by other suitable means. Upon the other end of one of the rolls A is a wide flange A', which overlaps the adjacent end of the other roll, covering the trough formed between the rolls, and thus limiting the spread of the glass in that direction. A similar flange B' is used upon the end of one of the pair of rolls B to maintain a smooth edge of the glass sheet in the second rolling, and a second plate M may be used also above these rolls B, if desired. The hopper preferably is provided with a curved projecting lip $L^3$ for convenience in pouring glass from a melting-pot into the hopper. The hopper has an open bottom, and to close this there are provided two curved swinging gates or shutters I I. (Shown in perspective in Fig. 12.) The gates I are bolted to a cross-bar $I^{10}$, having integral arms $I^8$ and $I^9$ at its ends, the upper ends of which are secured by a pivoting-bolt $I^7$ to the fixed end of the hopper at one end and to a cross-bar $I^{11}$ at the open end of the hopper. The plates I are bent upon a curve whose center is in bolts $I^7$ and the parts so proportioned that they fit loosely under the bottom of the hopper and their ends can meet at its center or swing apart the full width of the open bottom. To open and close these gates, I provide a shaft $I^6$, Figs. 1 and 10, having upon each end a two-arm lever $I^3\ I^4$, the upper ends of which are connected to arms $I^8$ by bars $I^2$ and the lower ends to arms $I^9$ by bars I'. To one end of shaft $I^6$ is secured a hand-lever $I^5$. It will be seen that by pulling lever $I^5$ downward it will close both gates I and by pulling it upward it will open both gates, so that by this lever one man has complete control of the flow of the plastic glass from the hopper to the rolls. When glass has been poured into the hopper, it is preferable to cover its top with sheet-iron shutters reaching from each side to near the web of netting $K^2$, that comes from the spool K over the idler K'. Such covers prevent the radiation of much heat from the glass and also thereby assist in heating the netting within the hopper before it enters the molten glass. There should be sufficient friction upon the spool K to produce a moderate tension upon the netting in its passage between the rolls A, which should be adjusted near enough each other for their teeth to press slightly against the netting with interlocking enough to kink the wires. These teeth or flutes upon the rolls A may be integral with the rolls or set into them and may be of any form desired, and I do not limit myself to the particular forms shown. For making wire-glass, where they have to be of slight depth, as about half the thickness of glass sheet, I prefer to make them as hooking as possible, so that they will catch or bite into the glass as much as possible. To increase this effect, I prefer to make the teeth square or upon radial planes of the rolls in front and curved, sloping, or angular upon their back sides; and to further increase depth and hooking effect or force of the teeth upon the glass I prefer to make a trough or depression immediately in front of each tooth or projection of about the same size as the tooth, thereby in effect doubling the depth of each tooth. This is best shown in the enlarged view in Fig. 17, in which the depressions $A^2$ in front of each tooth $A^3$ are about equal to the projection of the teeth beyond the plane part of the roll at $A^4$. The result of this is the production of a sheet of glass having projections $K^5$ immediately in front of and just sufficient to fill the depressions $K^6$ when passing between the smooth rolls B. This gives a finished smooth sheet with the least change from the initial rough sheet, as it is only necessary for the smooth rolls to transfer the projecting ridges $K^5$ into the depressions $K^6$, and the smooth rolls, passing crosswise of the depressions, completely fill them and obliterate all trace of them. Or if desired to make ornamental glass which freely transmits but refracts all light, so it cannot be seen through, one or both rolls B may have any such ornamental design formed in their surface for imprinting it upon the glass as it passes through. Such glass serves as an ornamental screen. At the same time it freely transmits all light in a subdued and diffused state, making it very desirable in many places.

In forming wire-glass I prefer to use a large pair of pivotally-suspended shears $h\ h'$ immediately below the pair of rolls A. These shears are best shown in Figs. 4 and 6. The shaft $h^2$ is pivotally mounted in or upon the frame of the machine. Near each end of this shaft $h^2$ are mounted levers $h^4$, upon the inner ends of which is fixed a shear-blade $h$, to the projecting end of which at $h^{11}$ is pivoted a second shear-blade $h'$, having a long lever-handle at its other end, by which it may be drawn under the other blade $h$, as shown in dotted lines, and cut off the sheet of wire-glass $K^3$, which descends between the open blades $h\ h'$, as shown in Fig. 6. The top of the blade $h$ has a sloping curved plate $h^{10}$ secured to its top to deflect or guide the sheet of glass down between the blades or to prevent its end from catching on the flat top of the blade $h$. The blades of the shears are sharpened and shaped as ordinary shears; but with the long handle they have great power, and both the glass and the wire-netting in it being red-hot at this point are easily clipped off at one stroke of this long blade $h'$. Upon the other ends of the levers $h^4$ are counterbalancing-weights $h^3$, which are so adjusted as to normally hold the shears in their elevated position near the rolls A.

To the under side of the shear-blade $h$ is attached a cord or cords or chains $h^7$, which passes down under the roll B, or under a guide-pulley on its end, and connects to the end of a rod $h^8$. On this rod $h^8$ is an adjustable stop $h^9$, which is adjusted a distance from the shear-blade $h$ equal to the length that it is desired to cut the glass sheets, so that when the end of the advancing sheet comes against the stop $h^9$ this pulls the shears down with the descent of the sheet and while it is being cut off, the swinging movement of the shears on the pivot-shaft $h^2$ giving plenty of time for this cutting off by the man whose business it is to do this. If, however, the cut-off man neglects to cut it off at the proper time, a further movement of the shears causes the cord $h^6$, attached to the stop $h^9$ and to the outer ends of the levers $h^4$, to pull the stop $h^9$ up and detach it from the end of the glass sheet, as shown in dotted lines in Fig. 4, which permits the sheet to pass on uncut. At the proper point for the cut to be made a tripping stop $n$ may be located within the path of the sheet, which, when it is tripped, rings a bell $n'$. In Fig. 7 is shown a modified form of this measuring device, in which the cord $h^7$ of Fig. 4 is replaced by a rod $h^7$ and a bell-crank $h^5$. In this case the shears are placed below the rolls B and adapted for cutting off smooth sheets without wire-netting in them, such as are made in the machines shown in Figs. 2 and 3. In Figs. 3 and $3^a$ is shown a roller J, having a sharp-edged projection $J'$ along one of its sides for cutting off sheets of glass against the roller B by turning the crank $J^2$.

Below the smoothing-rolls B, I use a concave-surfaced plate or block $C'$, Figs. 1 and 4, or a block of green or damp wood $C^3$, Figs. 2, 3, and 7. The plate $C'$ may be of cast metal with hollow spaces within and be supplied with water or other cooling medium through openings $c'$ for its entrance and exit. Similar straight-topped plates $C^2$ may be extended along any distance desired, preferably slightly inclined for the glass sheets to slide over until sufficiently cooled and stiffened to bear handling and removal to the annealing-oven. These plates $C'\ C^2$ are made in sections, and between the sections are pairs of rolls $D\ D'$, positively driven, whose purpose is to keep the glass sheets $K^4$ constantly moving and to prevent their sliding too fast when the way is inclined, the incline being given so that the sheets will nearly slide of themselves by gravity.

In Figs. 1, 2, and 3 I have shown endless aprons $F^4$, carrying cross bars or slats $F^2$, which may be of metal or damp wood. These aprons pass over rolls F, with tighteners $F'$, and are arranged with the tops of the bars $F^2$ in straight line, the top part of the apron being supported upon a floor $F^5$ upon suitable cross-bars. Along one side is arranged a pipe or series of pipes having openings $c'$, which blow compressed cold air into and across through the spaces between the bars $F^2$ under the glass sheets $K^4$ and above the apron $F^4$. This air-blast rapidly cools the bottom of the glass sheets while being carried along, and at the same time pipes G, with perforations in their bottoms, extending across over the glass sheets, blow blasts of cold air on top of the glass, and thus cool it upon both sides. It is also sometimes desirable to use these cold-air pipes G between the different pairs of rolls for cooling the glass sheet in its descent, as shown in Figs. 2, 3, and 4. This air may be received from any suitable source, as a compressor or blower.

In Figs. 4 and 5 are shown a modified form of the conveyer and cooler, Fig. 5 being a cross-section at 5 5, in which slats or bars $g$ are placed lengthwise or slightly diagonal of the line of travel of the glass, on top of which the sheets slide, while cold blasts of air are delivered through perforations in the pipe $G'$ between the bars $g$ over the floor $g'$, which air passes lengthwise between the bars $g$ and out at the arrow in Fig. 4. The off-bearing and cooling table, of whatever form, should be extended, say, fifty to one hundred feet, according to the thickness of glass to be made, so as to give the glass time to be cooled until stiff before it reaches its end, where it may be shoved on top of an adjustable top of a truck. (Shown at the lower end of Fig. 4.) The side bars Q of this truck may be adjusted to the same inclination as the glass sheets $K^4$ and supported by pivoted legs $Q'$. To the side bars Q are pivoted parallel connecting-bars $Q^3$, which support the platform $Q^2$ parallel with the side bars at whatever elevation it is raised. The rear bars $Q^3$ are rigidly connected at each side of the truck with the cross-shaft $Q^5$, to which is also rigidly fixed a lever-handle $Q^4$, by which the platform $Q^2$ can be raised or lowered until its top is in line with the top of the conveyer, so that the glass will slide straight upon its surface. When one sheet is upon it, it is lowered the thickness of that sheet by the handle $Q^4$, and is lowered a little farther for each successive sheet until all the sheets made from a pot of glass have been received upon it, and upon which they are wheeled off to the annealing-oven.

In Fig. 14 are shown very simple means for adjusting one roll toward and from the other in each pair. The journals of the rolls upon the right hand are supported in bearings in the ends of pivoted bars P, Figs. 10, 13, and 14. The pivoted ends of these bars are secured to a suitable bracket $P^7$, attached to the frame of the machine, as shown, or otherwise. The other end of each bar P has a journal-bearing for the roller-shafts $A'$ or $B'$, and has a side lug $P^8$, to which is attached a connecting-bar $P'$. The upper one of these is shown connected to a short crank $P^2$ on the shaft $P^3$. This shaft also has a hand-lever $P^4$, by which the right-hand roll A may be pushed toward or pulled from the other roll A, which is mounted in fixed bearings. The lever $P^4$, and through it the roll A, is secured in any position desired by the curved notched rack $P^5$ and pawl, as shown, in the usual way. In the adjusting connection to the lower roll B the same means are used, except an eccentric cam $P^6$ is used instead of the short crank $P^2$ in the upper plan, which gives the same result in substantially the same way. By these adjustments the thickness of the glass sheet can be perfectly regulated, and for making sheet-glass without wire-netting in it, as in Figs. 2 and 3, the lower rolls may be set closer than the upper rolls, so as to further reduce the thickness of the sheet, the lower rolls being at the same time more rapidly driven to stretch out the sheet lengthwise in proportion to its reduction in thickness. To drive the rolls B at either the same speed as the rolls A or at a faster speed, I use a variable gear for connecting the lower pair of rolls to the upper pair, and I prefer that patented by Coleman Sellers September 10, 1861, No. 33,283, which has long given the most perfect results where used. Fig. 10 shows this variable gear in front elevation, and Fig. 16 shows it in side elevation, and Fig. 15 is a top plan view of the pivoted frame $N^6$, carrying central shaft $N^{11}$ with the two convex-faced disks $N^2$ $N^3$, which grip and press between them upon opposite sides the disks N and $N'$. The upper disk N is rigidly fixed to one of the upper roll-shafts $A'$, by which it is driven with the roll and shaft. The two disks $N^2$ and $N^3$ overlap the sides of N and are firmly pressed against it by coil-spring $N^5$, the pressure of which is adjusted by a flat screw-nut bearing against its other end, as shown. The disks $N^2$ $N^3$ also overlap and press upon the outer rim of the disk $N'$, which is rigidly fixed to the lower shaft $B'$. Rotation of disk N rotates the disks $N^2$ $N^3$ by frictional contact and the latter in turn rotates disk $N'$ and the lower pair of rolls to which it is secured. If the disks $N^2$ $N^3$ overlap disks N and $N'$ equally, as shown in dotted lines, they are driven at equal speed, if of equal size. If the swinging frame $N^6$ and disks $N^2$ $N^3$ are elevated, as shown in full lines, then the rim of N bears in nearer the center of $N^2$ $N^3$ and therefore drives them faster than N moves. At the same time the bearing-point of the disks $N^2$ $N^3$ is brought from some distance within on their convex surfaces to near their outer edges, where they travel faster than they do at the then bearing-points on the opposite side, where they are in contact with disk N. This therefore drives $N'$ faster than it was driven when the central disks overlapped it more, as shown in dotted lines, so that there is a gain of speed from N to $N^2$ $N^3$ and a further gain from these to $N'$, the amount of gain depending upon the relative amount of overlap of disks. The frame $N^6$, carrying the central disks, is pivotally mounted by the journals $N^7$ in suitable fixed bearings, while the other end is provided with any suitable means for moving and securing it in a position to give the desired speed of rolls B relative to that of rolls A. For this purpose I have shown an adjusting-screw $N^9$ passing through a nut $N^8$, secured pivotally in the extended arm of frame $N^6$, the other end of the screw being provided with a hand-wheel and with two fixed collars bearing against a fixed lug or bar $N^{10}$. This screw thus gives control of the position of the disks $N^2 N^3$ and thereby controls the relative speed of the upper and lower pairs of rolls. Both pairs of rolls may be driven by a pinion $O^4$, gearing into the spur gear-wheel $O$ on the roll-shaft $A'$, the wheel $O$ gearing into and driving wheel $O'$, and through the variable gear, at the other end, drives one of the lower rolls and from it is driven the other one at the same speed through gears $O^2$ and $O^3$. The pinion $O^4$ is upon a shaft provided with a crank $O^5$ at one or both ends for turning the machine by hand, and this shaft is also provided with fast and loose pulleys $O^6$ or other well-known means for driving the machine by power from any available source.

Figs. 2 and 3 show modifications adapted for making plates of glass without wire-netting in them. They differ from the other mainly in the size and form of the teeth or fluting of the upper pair of rolls. Fig. 2 shows rounded ends to the cogs or flutes with rounded end spaces between them, so formed that the sheet formed between them will come out of uniform thickness throughout. The rolls B below these are driven at a faster speed by the variable gear, so that they will pull upon the descending glass sheet and straighten out the corrugations formed by the rolls A, and also, if desired, stretch the sheet lengthwise and thereby reduce its thickness and smoothen its surfaces by the stretching, the same as is done in blown glass as distinguished from pressed glass. When this stretching is to be done, the lower rolls must be driven faster than the upper rolls, and must be adjusted slightly closer together to suit the resulting reduction of thickness of the sheet and to still give the rolls sufficient grip upon it to draw it out as desired. An additional pair of rolls C may be located below the rolls B to still further stretch and reduce the thickness of the sheet. It will also be understood that I may use two or more pairs of fluted or toothed rolls, the first pair being very coarsely fluted or toothed, the next pair finer toothed, and so on, to gradually reduce the sheet from a very rough to a smooth one. One or both rolls C, or, in their absence, one or both of the rolls B, may have figured designs upon their face if it is desired to imprint such designs in the glass sheets. At D D' and at $D^2 D^3$, I have shown guide-rolls which are positively driven so as to carry the sheet of glass along at uniform speed onto the bars $F^2$ of traveling belt $F^4$. These rolls have a very light pressure to not affect the surface of the glass, which is not very hard at this point. Between these two pair of rolls is a pair of hot-polishing rolls E E', positively driven, E' with its surface traveling the same direction with the glass, but at a faster speed, and E moving with its surface in the opposite direction to that of the glass, so that this rubbing in opposite directions neutralizes the propelling effect of each other and permits the sheet to slide freely between them while being rubbed by them. The surfaces of these rolls E E' are of any material adapted to polish hot glass by rubbing contact—such as polished metal of a non-oxidizable kind, or of fine-grained damp wood, which may be kept moist by their surfaces rubbing against wet felt dipping into a suitable trough or other supply of water. This hot-polishing by rubbing the glass while red-hot or nearly so is the same as that much practiced upon pressed glassware by rubbing it with a wet wooden paddle called a "battledore." When embossed designs are imprinted in the surface of the glass, these polishing-rolls are not needed and the glass may pass direct to the off-bearing apron, as shown in Fig. 3. Of course the hot-polishing rolls may be used with or without the intervention of the pair of rolls C.

In Fig. 3 the rolls A are made with angular sharp-edged ribs $A^3$ or flutes so shaped as to deliver a corrugated sheet of uniform thickness throughout, and which is stretched out straight and further treated the same as described in connection with Fig. 2. It must be understood that the same kind of hopper and same form of bottom-closing gates I and their operating mechanism, together with the same gear, the same shears, and the same off-bearing mechanism, may be used with each of the other parts of construction shown.

The rolls A and B are preferably made hollow, with holes through their journals A' and B' for the admission and exit of a heating and cooling medium, as hot and then cold water, through the pipe connections and stuffing-boxes shown in Fig. 10. The rolls A and B may, however, be kept from overheating by moist felt touching their outside at a suitable point as they rotate, the felt being kept supplied with a suitable amount of water from troughs suspended near them. The moisture would thus be imparted most to the projecting teeth $A^3$ on the rolls A, where it is most needed.

It will be seen that while heretofore it has been the plan in attempts to roll a mass of plastic glass to pour the hot glass directly upon the rolls in my machine it is preferably poured into the hopper above the rolls and that it does not come in direct contact with the rolls until everything is ready for the machinery to start, when it is let down by an attendant and does not have to wait there for anything else, but starts directly through the rolls, and, furthermore, it can be let down in a stream or sheet as thin as desired, so that little of it comes in contact with the rolls before passing through and need not spread broadly over them, as in efforts heretofore made. This feature alone is of so much importance that it makes the difference of success and failure. Then, again, in my machine, instead of smooth rolls that have little or no bite upon plastic glass, I use the toothed or fluted rolls that bite into and force the glass along with them, this force being in addition to the force of gravity, which coacts with the force of the teeth and assures success where gravity alone has failed. A still further force may be used, if desired, being tension applied to the netting by setting the rolls close enough to slightly grip it between them and pull it through, which cannot be done with smooth rolls, as they have no grooves or pockets in which to carry the glass, and hence must be spaced apart far enough to permit the passage between them of the full thickness of both the netting and the glass outside of it, so that they cannot grip or pull any upon the netting. In my method the glass hangs on the netting below the upper rolls, and being distributed along on and within the netting the netting sustains the weight of it and prevents it from stretching by its own weight and spoiling it even when it is so hot and soft that it would do so without the wire-netting in it.

Some of the further advantages of my method may be stated as follows: The netting being introduced endwise into the sheet, there are no impressions left upon the side of the sheet; second, the glass descending vertically into the mass of glass all air-bubbles and all generated gases are driven up out of the meshes of the netting as the molten glass flows up into them, thus leaving the glass clear and free from bubbles and "seeds;" third, the wires are so completely heated in their descent through the hopper of hot glass that they are perfectly and uniformly welded to the glass through its whole extent, thereby giving the maximum amount of strength and rigidity to the sheet as a whole; fourth, the wire being embedded at the center of the sheet and both faces being solid and unbroken by side introduction of the wires there are no holes, cracks, or pores in the glass through which moisture or corroding gases can find a way in to corrode the wires; fifth, being free from air-bubbles and from surface creases the amount of light transmitted and the clearness of the glass are greater than with that heretofore made, even without hot-polishing its surface; sixth, the sheets are cut while hot in the process of making to any desired dimensions, and being hot-cut the cut ends are smooth and even compared with wire-glass which has been cut cold; seventh, the whole process of making it is continuous and rapid, thereby making the product much cheaper than made as heretofore. The fluted rolls may be fifteen to twenty inches in diameter, or more, and thirty inches in length, more or less, according to the width of the widest wire-glass desired to be made, and for plate-glass without netting, or even with it, may be much longer. The smooth rolls may be of the same or of a different diameter from the fluted rolls.

It is to be understood that where I use the term "smooth" roll or rolls in this specification and in the claims such rolls may be either plain polished cylinders or they may have intaglio or relief designs or ornamentations in or upon their surfaces to thereby imprint the glass surface, such as will not interfere with the transformation of the rough initial sheet into one of the desired finish, more or less smooth, as desired.

I am aware of the Simon patents, in which a single pair of rolls with slightly-waved surfaces is intended to roll previously-formed slabs of hot glass, not to roll a mass of plastic glass into a slab or sheet, and there are no smooth rolls or hopper, nor is it possible to make wire-glass on such a machine.

What I claim, and desire to secure by Letters Patent, is—

1. The method of making wire-glass which consists in passing wire-netting down through a mass of glass made plastic by heat, thereby heating the netting, filling its meshes with plastic glass and welding it thereto by heat, then forming the glass into an initial sheet upon the netting with a series of projecting ridges and corresponding depressions upon each side of the glass, then flattening down the projections into the depressions to produce a smooth sheet, substantially as set forth.

2. The method of making wire-glass which consists in first forming the glass into a proper plastic working condition by heat, second passing wire-netting into and through the plastic mass of glass, third distributing the plastic glass along upon each side of the netting in a series of ridges with intervening depressions extending into the netting, and fourth transferring the glass from said ridges into said intervening depressions, thereby transforming the ridged and grooved sheet into a sheet having smooth surfaces upon both sides with the netting entirely inclosed therein and welded thereto, substantially as set forth.

3. The method of making wire-glass which consists in passing wire-netting down through the midst of a semimolten mass of glass, agitating, mixing and distributing the lower portions of the mass of glass upon each side of the netting in a series of ridges and depressions, then flattening down the ridges into the depressions and making plane or other finished surfaces upon the sides of the glass with the netting inclosed therein, substantially as set forth.

4. The method of making wire-glass which consists in passing wire-netting down through a semimolten mass of glass, agitating, mixing and applying the lower portion of the glass to both sides of the passing netting in a series of projecting ridges with intervening depressions about equal in size to the projecting ridges, then flattening down the ridges into the depressions, substantially as set forth.

5. The method of making wire-glass which consists in passing wire-netting down centrally through a mass of glass made plastic by heat, thereby heating the netting and filling its meshes with plastic glass, then passing a stream of the glass with the netting embedded therein down from the mass of glass and forming an initial sheet with a series of projections and corresponding depressions upon each side, then smoothing the projections down into the depressions and forming a smooth sheet, substantially as set forth.

6. In apparatus for making rolled sheet-glass, the combination of a hopper having a pair of bottom-closing gates, opening from the center, a pair of fluted rolls thereunder and adapted to receive plastic glass therefrom and form it into an initial rough sheet and a pair of finishing-rolls, located below the fluted rolls, and adapted to transform the initial rough sheet into a smooth or ornamented sheet, substantially as set forth.

7. The combination of a pair of fluted rolls, a pair of pivotally-suspended shears located under the fluted rolls and a pair of smooth rolls located under the fluted rolls, substantially as set forth.

8. The combination of a pair of rolls so fluted as to form a series of projecting ribs, depressions or pockets in front of each rib which carries sufficient plastic glass to fill the depression formed by the projecting rib in the initial rough sheet, a pair of smooth rolls below the fluted rolls which are adapted to transfer the projecting ridges of glass into the corresponding depressions of the sheet, thus converting the rough sheet into a smooth one, substantially as set forth.

9. The combination of a pair of fluted rolls having projecting longitudinal ribs adapted to guide wire-netting centrally between the rolls and having intervening depressions or pockets between the ribs adapted to measure and distribute equally upon each side of the netting a sufficient quantity of plastic glass to form a finished sheet and a pair of smooth rolls adapted to roll down the projections and fill the depressions, thus forming the finished sheet, substantially as set forth.

10. In a glass-rolling apparatus, a pair of fluted rolls having upon their surface ribs $A^3$ projecting above the general surface $A^4$ and depressions $A^2$ in front of each rib, the projecting ribs being of about the same size as the depressions in front of them, substantially as and for the purpose set forth.

11. In a glass-rolling apparatus, a hopper having in its open bottom a pair of closing gates I adapted to form a rectangular opening in the center of the bottom of any desired width to permit passage of corresponding thickness of stream of plastic glass, in combination with a pair of fluted rolls, so located that their bite is in vertical line with the stream of plastic glass, and a pair of smooth rolls located below the fluted rolls, substantially as and for the purpose set forth.

12. The hopper L, having closing bottom gates I, I, suspending-arms $I^8$, $I^9$, in combination with connecting-bars $I'$, $I^2$, bell-crank levers $I^3$, $I^4$, upon each end of shaft $I^6$, and hand-lever $I^5$, substantially as set forth.

13. A hopper L having an adjustable end $L'$, secured by arms $L^2$, and adjustable gates I, in combination with a pair of fluted rolls and a pair of smooth rolls, substantially as set forth.

14. In an apparatus for making sheets of glass, a pair of swinging shears comprising a pivoting-shaft $h^2$ having a lever $h^4$, fixed at each end thereof, having counterbalancing-weights $h^3$ at their outer ends and a fixed shear-blade $h$ at their inner ends in combination with the lever shear-blade $h'$ pivoted to blade $h$ at $h^{11}$, substantially as set forth.

15. The combination of a hopper, a pair of fluted rolls, a pair of smooth rolls, a concave deflecting guide-block $C'$ for turning the glass sheet from a vertical direction onto a suitable off-bearing conveyer, substantially as set forth.

16. In an apparatus for making sheets of glass, a length-measuring and cutting device comprising the pivotally-mounted arms $h^4$, carrying counterbalancing-weights at one end and shears at the other, flexible connection $h^7$ from the shears to a stop $h^9$ adapted to engage with the front end of the glass sheet and to move the shears with the glass sheet, substantially as set forth.

17. In apparatus for making sheets of glass, the combination of the centrally-pivoted arms $h^4$, having counterbalancing-weights at one end and shears at the other, connecting means between the shears and a movable stop adapted to engage the advancing end of the sheet of glass and connecting means between the stop and the pivoted arms at the opposite end from the shears, substantially as set forth.

WM. ED. SMITH.

Witnesses:
JOHN WILSON,
HENRY F. RUSH.